United States Patent
Brand (10) Patent No.: US 10,234,689 B1
(45) Date of Patent: Mar. 19, 2019

(54) COMPOUND OPTICS WITH FREEFORM OPTICAL SURFACE

(71) Applicant: Mitsubishi Electric Research Laboratories, Inc., Cambridge, MA (US)

(72) Inventor: Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/917,074

(22) Filed: Mar. 9, 2018

(51) Int. Cl.
*G02B 13/18* (2006.01)
*G02B 27/09* (2006.01)
*H05B 33/08* (2006.01)

(52) U.S. Cl.
CPC ......... *G02B 27/0955* (2013.01); *G02B 13/18* (2013.01); *H05B 33/0803* (2013.01)

(58) Field of Classification Search
CPC .............................. G02B 13/18; G02B 13/0955
USPC .......................................................... 362/326
See application file for complete search history.

(56) References Cited

U.S. PATENT DOCUMENTS

| 5,790,305 | A |   | 8/1998 | Marcellin-Dibon et al. |
| 6,038,077 | A | * | 3/2000 | Braat ................ G02B 13/18 359/642 |
| 7,460,985 | B2 |  | 12/2008 | Benitez et al. |
| 2005/0086032 | A1 | * | 4/2005 | Benitez ............ G02B 27/0012 703/1 |
| 2006/0098447 | A1 |  | 5/2006 | Griesinger et al. |
| 2007/0176187 | A1 | * | 8/2007 | Iwanaga .................. F21K 9/00 257/79 |
| 2007/0268694 | A1 | * | 11/2007 | Bailey ................ G02B 27/0955 362/231 |
| 2015/0127304 | A1 |  | 5/2015 | Cassarly |
| 2018/0199017 | A1 |  | 7/2018 | Michaelis et al. |

OTHER PUBLICATIONS

Fournier, "Freeform Reflector Design With Extended Sources," A dissertation submitted in partial fulfillment of the requirements for the degree of Doctor of Philosophy in CREOL, the College of Optics and Photonics at the University of Central Florida, Orlando, Florida. Summer 2010.

* cited by examiner

*Primary Examiner* — Christopher Raabe
(74) *Attorney, Agent, or Firm* — Gene Vinokur; James McAleenan; Hironori Tsukamoto (57) ABSTRACT

An optic to transform incident light emitted by a light source to form an irradiation pattern on a projection surface has a freeform surface formed by a union of an aspheric lens and a collection of Cartesian ovals. Each Cartesian oval is a lens focusing the incident light to a point and the collection of Cartesian ovals directs the incident light to a collection of points forming a border of the irradiation pattern. The aspheric lens is a portion of a refractive lens directing the incident light to form an interior of the irradiation pattern. The aspheric lens is combined with the collection of Cartesian ovals to form the union, such that each Cartesian oval shares a radiant focus of the refractive lens and makes a tangential contact with the surface of the aspheric lens at a single point.

18 Claims, 11 Drawing Sheets

COMPOUND OPTICS WITH FREEFORM OPTICAL SURFACE

TECHNICAL FIELD

This invention relates to optics, and more specifically to optics having a freeform optical surface transforming incident light to produce an illumination pattern.

BACKGROUND

The field of non-imaging optics has long sought a method to design optical surfaces that transform an incident light emitted by a light source into an arbitrary illumination pattern. In the last two decades, substantial progress has been made for the zero-étendue case, an idealization where light rays are exactly parallel or exactly diverging from a single point. This idealization allows a one-to-one correspondence between rays in the emitted light and rays in the target illumination pattern. This one-to-one correspondence reduces the design problem to determining an optical surface whose reflections or refractions implement a one-to-one mapping between the spatial density of rays in a cross-section of the emitted light and the spatial density of rays in the target illumination pattern. If a smooth mapping is possible between the initial and target densities, which is almost always the case for the zero-etendue systems, then that mapping can be found using the methods borrowed from the field of optimal mass transport. The resulting optics can produce detailed illumination patterns, for example, projecting photographic images. These optical surfaces are generally denoted as freeform optical surfaces, simply because their shapes are more complicated that any of the simple algebraic surfaces typically associated with lenses and mirrors.

In reality, the zero-étendue light source do not exist. Practical light sources, e.g., light-emitting diodes (LED), have spatial extent, i.e., light rays are emitted from an area, not a point, and these rays cross during their propagation, making one-to-one mappings impossible, and pushing the problem outside the scope of what optimal mass transport can solve. If a freeform optical surface is illuminated by a spatially extended light source, the resulting illumination pattern is significantly blurred, much as a shadow on a cloudy day becomes soft and indistinct. According to the second law of thermodynamics, this blurring is inescapable.

Consequently, when freeform optics are designed for spatially extended light sources, optical engineers have much more modest goals typically just achieving approximately uniform illumination in a circular or polygonally bounded region. Furthermore, it is usually accepted that there will be a blurry halo of uncontrolled illumination fall-off outside this region, even though that can be undesirable in some applications. Some researchers also seek to control this halo and achieve a sharp fall-off. The method of Simultaneous Multiple Surfaces (SMS) offers some control of the boundary by routing rays from the edge of the light source to predetermined targets; optimal mass transport combined with approximate deblurring can sometimes achieve sharp edges in the irradiation pattern. However, in both approaches, the final irradiation pattern suffers from an uncontrolled trade-off between blurry edges and undesirable texture artifacts inside the irradiation pattern.

The problem of obtaining a uniform irradiance from an Lambertian source has received much attention since the advent of high-powered LEDs. To date, all design methods are approximate. Furthermore, many of the methods proposed to design freeform surfaces rely on simplifying assumptions about the light source, most commonly, that it provides uniform flux through the lens. Most modern light sources are Lambertian, with flux intensity along any ray proportional to the cosine of the angle between that ray and the optical axis. This has to be modeled very carefully in the optimization, else the irradiance image has quite noticeable artifacts.

Accordingly, there is a need for methods that can transform incident light from the spatially extended light source into a target illumination pattern with sharp edges. Those methods can be beneficial for a number of optical applications, such as optics for signage illumination and specialized task lighting.

SUMMARY

It is an object of some embodiments to provide an optic that can produce complex irradiance patterns with sharp boundaries and no spill in the background outside those boundaries. It is another object of some embodiments to provide such an optic that can produce the complex irradiance patterns with uniformly lit interiors.

Some embodiments are based on recognition that a special type of lens, referred herein as a Cartesian oval, focuses the incident light to a point without any light pollution outside of that point. To that end, the collection of Cartesian ovals can direct the incident light into a collection of points. When using an extended light source, the point becomes extended, but it retains a sharp boundary and the collection of points can similarly form an extended shape with sharp boundaries. For example, such a collection of points can form an irradiation pattern and/or border of the irradiation pattern. Such irradiation pattern can have a complex form to include a glyph, a letter forming a word and/or a signage.

Some embodiments are based on another recognition that a refractive lens transforms the incident light to irradiate the projection surface. A typical refractive lens directs the incident light inside and outside of a desired irradiation pattern, like a glyph. A portion of the refractive lens that directs the light onto the desired irradiation pattern is useful for formation of the irradiation pattern. The rest of the refractive lens irradiate the projection surface outside of the desired irradiation pattern and is not useful for formation of the irradiation pattern.

Some embodiments are based on realization that the "not useful" portion of the refractive lens can be replaced with the collection of the Cartesian ovals directing the light previously collected by the "not useful" portion of the refractive lens to the points on the border of the irradiation pattern. In such a manner, a two tone image can be formed with an interior formed by the "useful" portion of the refractive lens and the border illuminated by the incident light refracted by the collection of the Cartesian ovals.

Some embodiments are based on recognition that a number of light sources, such as LED light-emitting diodes (LED), are Lambertian light sources emitting rays of light according to Lambert's emission law, which says that the radiant intensity or luminous intensity observed from an ideal diffusely reflecting surface or ideal diffuse radiator is directly proportional to the cosine of the angle $\theta$ between the direction of the incident light and the surface normal. To that end, a projection surface illuminated by a Lambertian light source shows an irradiation with intensities dissipating from a bright center. Thus, a typical lens shaped to direct incident light emitted by a Lambertian light source to form a specific irradiation pattern, like a glyph or a signage, produces that irradiation pattern having a non-uniform irradiation inside the irradiation pattern and/or polluted background with light spilling outside of the desired irradiation pattern.

Some embodiments are based on recognition that it is possible to design a lens that has such a refractive surface that uniformly irradiates a disk in response to illumination by a Lambertian light source. Such a lens is referred herein as a Lambertian-uniformizing spot lens. To that end, when the refractive lens is Lambertian-uniformizing spot lens, a two-tone image with uniform interiors, bright borders, and dark exterior can be displayed on the projection surface illuminated by the Lambertian light source.

In geometry, a Cartesian oval, named after Rene Descartes, is a plane curve, the set of points that have the same linear combination of distances from two fixed points, called the foci. In optics, the Cartesian oval is a lens having a refracting surface formed by revolving a Cartesian oval curve around the axis through its two foci. Rays from either of the foci are refractively focused to the other. Some embodiments are based on realization that a collection of Cartesian ovals can be used to redirect emitted light away from the exterior of the desired irradiance pattern and onto the border of said irradiance pattern.

In such a manner, an optic for transforming incident light emitted into the two-tone irradiation pattern can be formed by a union of a portion of a Lambertian-uniformizing spot lens producing an interior of the irradiation pattern, and a collection of Cartesian ovals focusing the remaining light from the Lambertian light source along the border of the irradiation pattern. In the optic producing such a two-tone irradiation pattern, each Cartesian oval shares the radiant focus of the Lambertian-uniformizing lens, and each Cartesian oval makes a tangential contact with the surface of the Lambertian-uniformizing lens at a single point.

Notably, the shapes of the Lambertian-uniformizing spot lens and the collection of Cartesian ovals can be analytically determined. In such a manner, the resulting optics for producing two-tone images can be also analytically determined.

Accordingly, one embodiment discloses an optic to transform incident light emitted by a light source to form an irradiation pattern on a projection surface, wherein the optic has a freeform surface formed by a union of an aspheric lens and a collection of Cartesian ovals, wherein each Cartesian oval is a lens focusing the incident light to a point, and wherein the collection of Cartesian ovals directs the incident light to a collection of points forming a border of the irradiation pattern, and wherein the aspheric lens is a portion of a refractive lens directing the incident light to form an interior of the irradiation pattern, wherein the aspheric lens is combined with the collection of Cartesian ovals to form the union, such that each Cartesian oval shares a radiant focus of the refractive lens and makes a tangential contact with the surface of the aspheric lens at a single point.

Another embodiment discloses a method for fabricating an optic, including determining a freeform optical surface transforming incident light emitted by a Lambertian light source into an illumination pattern on a projection surface, wherein the freeform optical surface of the optic is formed by a union of a portion of a Lambertian-uniformizing spot lens producing, in response to illumination by the Lambertian light source, a uniform irradiation on the projection surface forming an interior of the irradiation pattern, and a collection of Cartesian ovals focusing the light from the Lambertian light source along the border of the irradiation pattern; and fabricating the optic having the freeform optical surface.

Yet another embodiment discloses an optic, including an aspheric lens formed by a portion of a Lambertian-uniformizing spot lens transforming incident light emitted by a Lambertian light source into uniform irradiation; and a union of Cartesian ovals, wherein each Cartesian oval is a lens focusing incident light to a point, wherein each Cartesian oval shares the radiant focus of the Lambertian-uniformizing lens and makes a tangential contact with the surface of the aspheric lens at a single unique point.

DETAILED DESCRIPTION

Figure 1A:
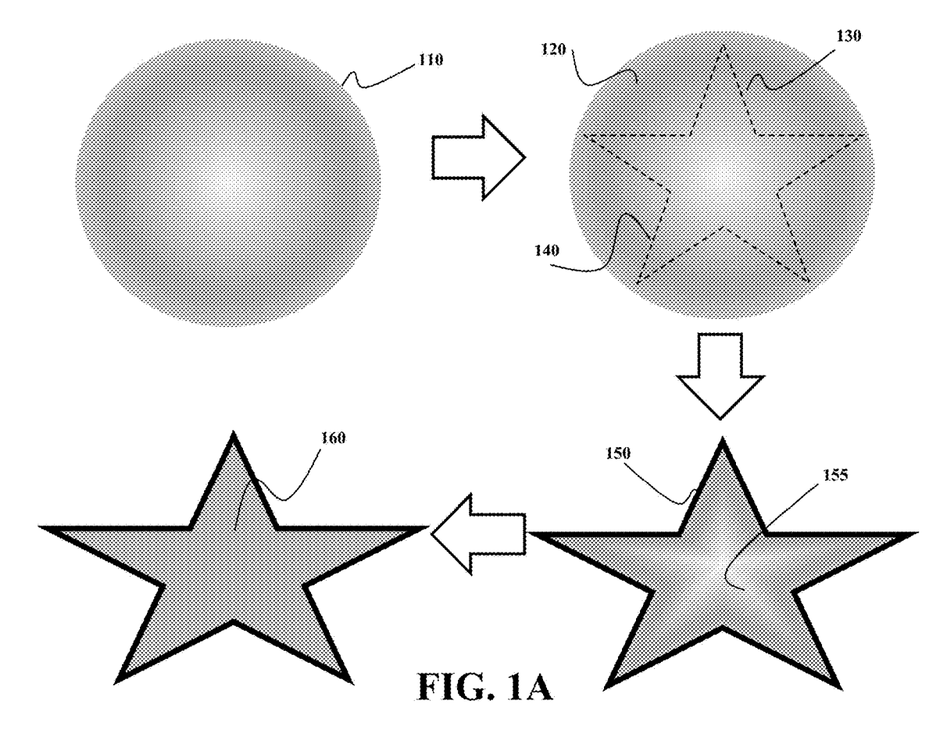
FIG. 1A is a schematic of irradiation patterns illustrating principles used by some embodiments.

FIG. 1A shows a schematic of irradiation patterns illustrating principles used by some embodiments. Some embodiments are based on recognition that a typical refractive lens transforms the incident light into a disk of irradiation 110 projected on a projection surface. However, it is an object of some embodiments to modify the refractive lens to transform the incident light to a specific irradiation pattern, like a pattern within a contour 130. Some embodiments are based on recognition that the typical refractive lens directs the incident light inside 140 and outside 120 of the irradiation pattern 130. A portion of the refractive lens that directs the light inside 140 the irradiation pattern 130 is useful for formation of the irradiation pattern. The rest of the refractive lens irradiates the projection surface outside 120 of the desired irradiation pattern, i.e., outside of the contour 130, and is not useful for formation of the irradiation pattern.

Some embodiments are based on realization that the "not useful" portion of the refractive lens can be replaced with the collection of the Cartesian ovals directing the light previously collected by the "not useful" portion of the refractive lens to the points on the border 150 of the irradiation pattern.

In such a manner, a two tone images can be formed with an interior formed by the "useful" portion of the refractive lens and the border illuminated by the incident light refracted by the collection of the Cartesian ovals.

Some embodiments are based on recognition that a number of light sources, such as LED light-emitting diodes (LED), are Lambertian light sources emitting rays of light according to Lambert's emission law, which says that the radiant intensity or luminous intensity observed from an ideal diffusely reflecting surface or ideal diffuse radiator is directly proportional to the cosine of the angle θ between the direction of the incident light and the surface normal. To that end, a projection surface illuminated by a Lambertian light source shows an irradiation with intensities dissipating from a bright center 155.

Some embodiments are based on recognition that it is possible to design a lens that has such a refractive surface that uniformly irradiates 160 the projection surface in response to illumination by a Lambertian light source. Such a lens is referred herein as a Lambertian-uniformizing spot lens. To that end, some embodiments design an optic to transform the incident light to form an irradiation pattern having uniform interiors 160 confined within the borders 150 of the irradiation pattern.

Figure 1B:
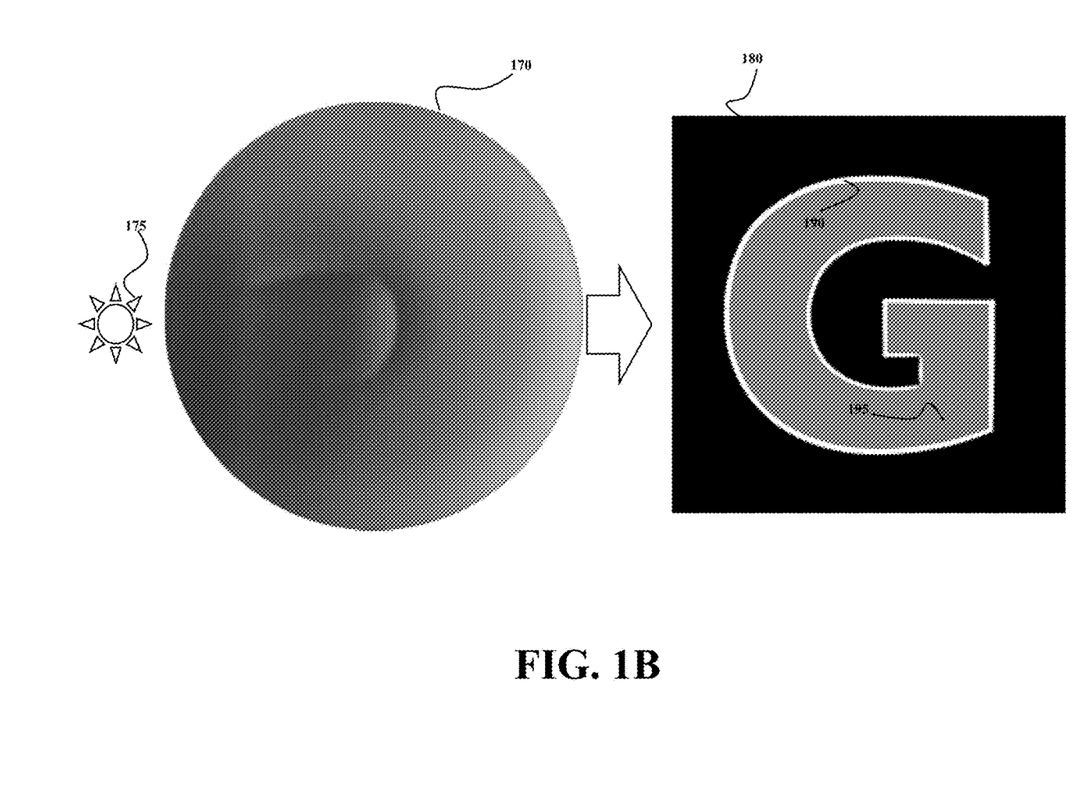
FIG. 1B is a schematic of an optic having a freeform optical surface designed by some embodiments using principles disclosed in relation to FIG. 1A.

FIG. 1B shows a schematic of an optic having a freeform optical surface designed by some embodiments using principles disclosed in relation to FIG. 1A. The optics 170 transform incidents light emitted by a light source 175 to form an irradiation pattern 180 according to some embodiments. The optic has a freeform surface formed by a union of a collection of Cartesian ovals and a portion of a refractive Lambertian-uniformizing spot lens.

A Cartesian oval is a lens focusing the incident light to a point, such that the collection of Cartesian ovals reflects incident light to a collection of points forming at least a border 190 of the irradiation pattern. The portion of a refractive lens directs the incident light to form the interior 195 of the irradiation pattern enclosed by the border 190. In some implementations, when the refractive lens is Lambertian-uniformizing spot lens, a two-tone image with uniform interiors, bright borders, and dark exterior can be displayed on the projection surface illuminated by the Lambertian light source.

Figure 2A:
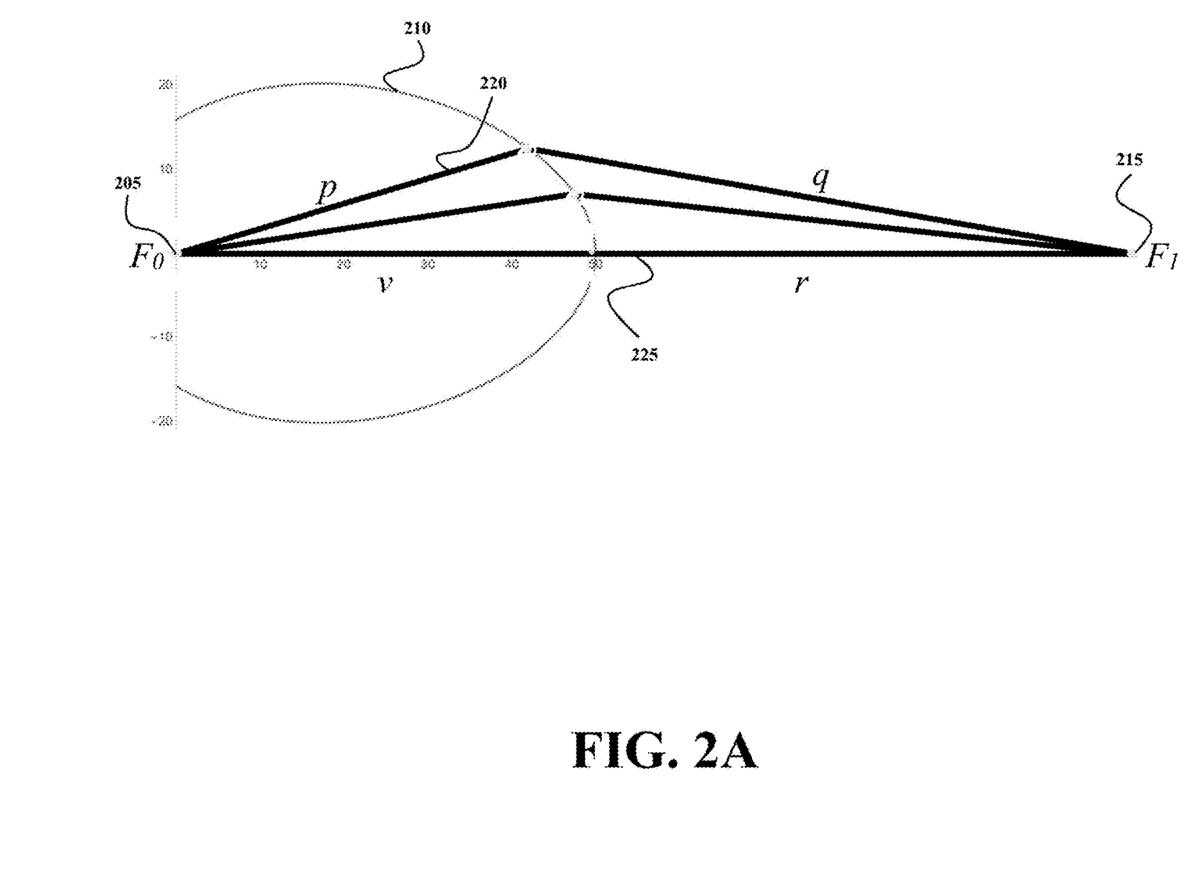
FIG. 2A is a schematic of a Cartesian oval lens used by some embodiments to refract rays.

FIG. 2A shows a schematic of a Cartesian oval lens 210 used by some embodiments to refract rays from the radiant focus $F_0$ 205 to the irradiant focus $F_1$ 215. Its defining property is that light takes the same time to propagate from $F_0$ to $F_1$, regardless of the path. This is possible because light is slowed by a factor of n inside the lens. Therefore, the travel time for the top 220 and bottom 225 paths are np+q=nv+r, where p, v and q, r are the straight-line travel distances traveled inside and outside the lens, respectively, for two different paths. Notably, the length v of the central ray from the focus to the vertex of the lens, the locations of the two foci $F_0 F_1$, and the travel time invariant are sufficient to completely determine the shape of the Cartesian oval 210.

Figure 2B:
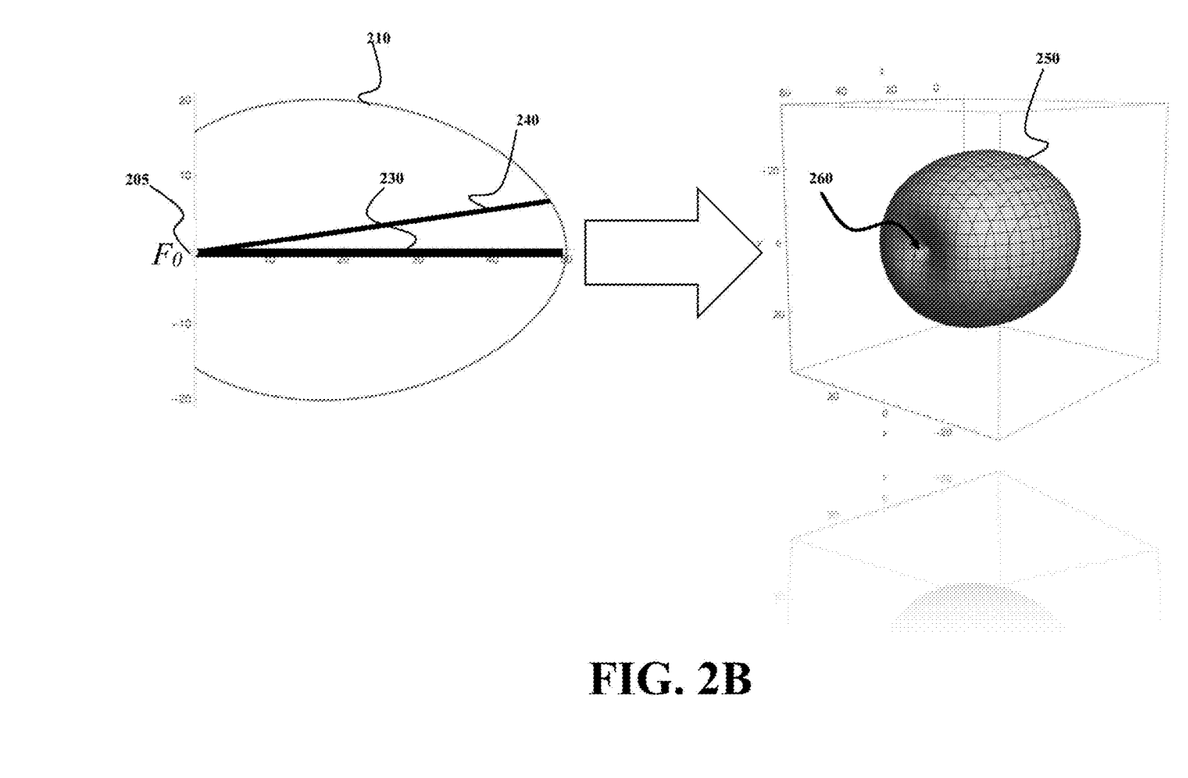
FIG. 2B is a schematic of forming a collection of Cartesian ovals to direct the light from outside of the irradiation pattern to a border of the irradiation pattern according to one embodiment.

FIG. 2B shows a schematic of forming a collection of Cartesian ovals to direct the light from outside of the irradiation pattern to a border of the irradiation pattern according to one embodiment. If the embodiment rotationally sweep the 2D Cartesian oval 210 around its optical axis 230, the resulting a 3D Cartesian oval focuses light from the point F0 205 to a point at F1 215. If the embodiment then rotationally sweep the 3D Cartesian oval around another line 240 that passes through the focus F0, the embodiment obtains a union of Cartesian ovals 250. In this example, the union of Cartesian ovals 250 focuses light from the focus F0 to a perfect circular ring on a projection plane. In constructing this swept volume, the central axis of the 3D Cartesian oval traces the path of the projected circle.

Notably, the front of the resulting union of a collection of Cartesian ovals includes a divot 260. The divot routes any rays that pass through it away from the interior of the ring, keeping the region dark. Various embodiments, use this principle to make irregular divots formed by sweeping Cartesian ovals through irregular paths governed by the shape of the irradiation pattern, and use these divots to keep irregular regions of the projection plane dark.

Figure 3:
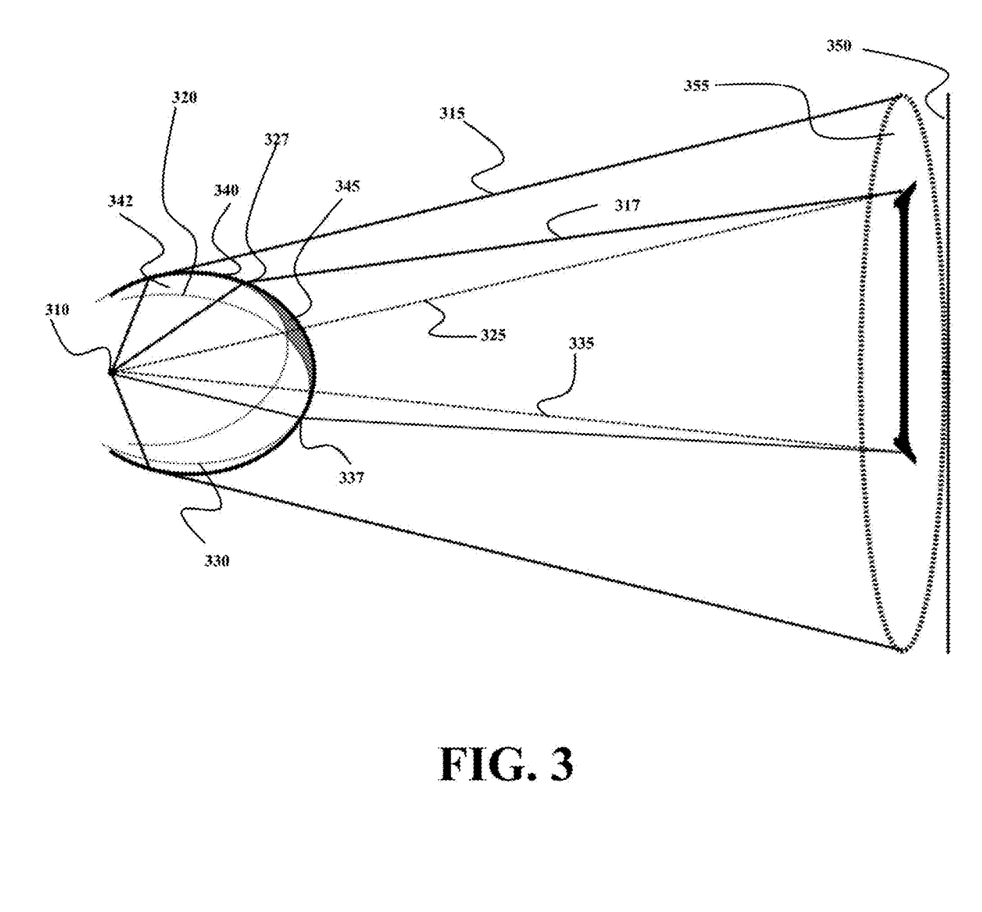
FIG. 3 is a cross-section of a lens formed by a combination of a refractive lens and a collection of Cartesian ovals according to one embodiment.

FIG. 3 shows a cross-section of a lens formed by a combination of a refractive lens and a union of the collection of Cartesian ovals according to one embodiment. In this illustrative example, a cross section of a refractive lens 340 (bold curve) that has a divot 345 (in grey) which leaves part of the irradiance image 355 on the projection plane 350 dark. In this example, the desired irradiation pattern is an irradiated disk with a dark letter "I." To that end, the portion 342 of the lens 340 that refract the incident light inside the desired irradiation pattern, i.e., outside of the desired dark letter I, is considered "useful" portion, and the portion 345 of the lens 340 that refract the incident light inside of the desired dark letter I is considered "not useful" portion. The useful portion of the refractive lens 340 is referred herein as an aspheric lens. To that end, an aspheric lens is a portion of a refractive lens directing the incident light to form an illuminated interior of the irradiation pattern.

The dark straight lines 315 and 317 are rays from the light source 310 to the projection plane 350. Two Cartesian ovals 320 and 330 (depicted with thin curved lines) have been superimposed on the lens 340. Each oval is tangent to the aspheric lens where one ray to the border of the "I" exits the lens, and that Cartesian oval is scaled and oriented to focus light at the endpoint of that ray. This means that the Cartesian oval's central axis 325 and 335 points at the corresponding endpoint. The two ovals are part of a sweep of similarly constructed ovals whose foci trace the border of the "I". The surface of the lens is made to follow the divot 345 formed by this sweep.

Some embodiments combine the useful portion of the refractive lens 340 directing the incident light inside the irradiation pattern, i.e., the aspheric lens, with the collection of Cartesian ovals directing incident light to the border of the irradiation pattern. Such a combination results in a freeform lens that has each Cartesian oval 320 and 330 sharing a radiant focus 310 with the refractive lens 340. The light is place at the radiant focus 310. In such a manner, both the refractive lens and the Cartesian ovals project the light onto the same projection surface 350. In addition, in some embodiments, each Cartesian oval makes a tangential contact with the surface of the useful portion of the refractive lens at a single and/or unique point. For example, the Cartesian oval 320 makes a tangential contact with the aspheric lens at a point 327. Similarly, the Cartesian oval 330 makes a tangential contact with the aspheric lens at a point 337. In such a manner, the combined optic is kept smooth and easy to manufacture.

As can be seen on FIG. 3, the optic is formed, at least in part, by a union of a collection of Cartesian ovals that merges the collection of Cartesian ovals together. The union of collections of the Cartesian ovals guarantees that the incident light that enters at least one Cartesian oval is directed on the contour or the border of the desired irradiation pattern. In various embodiments, geometry of each Cartesian ovals in the collection with respect to the geometry of the refractive lens is uniquely defined by the focus 310, direction of the optical axes 325 and/or 335, and a location of the tangent point 327 and/or 337. Different Cartesian ovals can have different geometric parameters. In various embodiments, the Cartesian ovals continuously trace the shape of the border of the irradiation pattern to ensure that the border is sharp, continuous, and brightly lit.

Figure 4A:
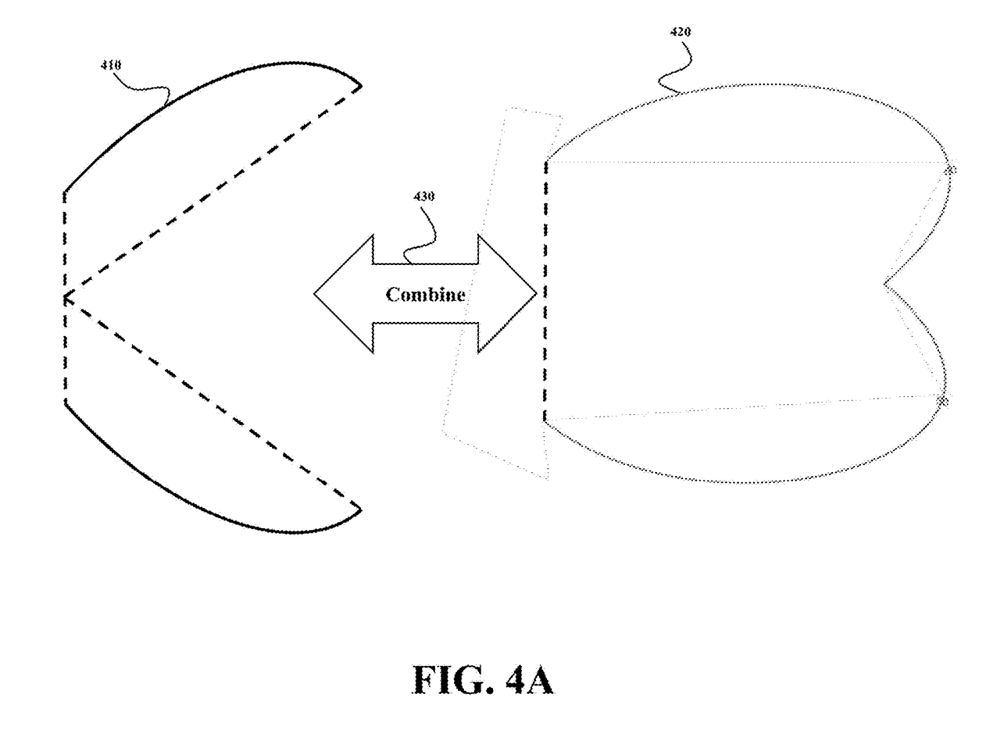
FIG. 4A is a schematic of forming an optic according to some embodiments.

FIG. 4A shows a schematic of forming an optic according to some embodiments. In those embodiments, the useful portion of the refractive lens, i.e., the aspheric lens 410, is combined 430 with the collection of Cartesian ovals 420. In various implementations, the collections of Cartesian ovals 420 has a surface formed by the union of the collections of Cartesian ovals 420 to ensure continuity of the border of the irradiation pattern. The aspheric lens 410 is a lens whose surface profiles are not portions of a sphere or cylinder. This is because the aspheric lens 410 is only a portion of the refractive lens. The combination 430 of the aspheric lens 410 and the collection of Cartesian ovals 420 is performed such that each Cartesian oval shares a radiant focus of the refractive lens and makes a tangential contact with the surface of the aspheric lens at a single point, as shown in FIG. 3.

In some embodiments, the intensity of the incident light follows Lambert's cosine law, such that the light source is a Lambertian light source and the refractive lens is implemented as a Lambertian-uniformizing spot lens reversing the Lambert's cosine law. In various embodiments, Lambertian-uniformizing spot lens produces, in response to illumination by the Lambertian light source, a uniform irradiation on the projection surface forming the interior of the irradiation pattern.

Figure 4B:
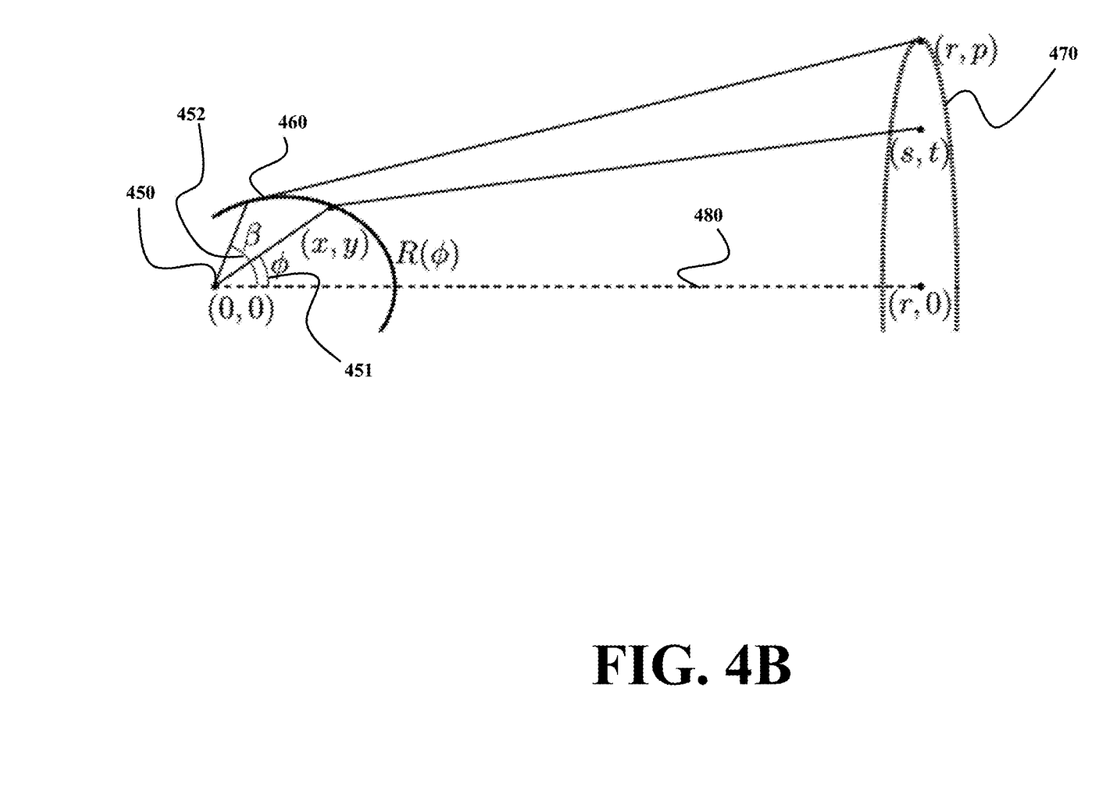
FIG. 4B is an exemplar schematic illustrating the Lambertian-uniformizing principles employed by some embodiments.

FIG. 4B shows an exemplar schematic illustrating the Lambertian-uniformizing principles employed by some embodiments. In this example, the Lambertian-uniformizing spot lens with a refractor surface $R(\phi)$ 460 converts light emitted by a Lambertian point source 450 at origin to a uniformly irradiated disk 470 of radius P at distance r 480.

Some embodiments design the Lambertian-uniformizing spot lens using a relationship between the emittance of a Lambertian light source and the surface area of a disk. Specifically, a Lambertian source radiates along inclination $\phi$ 451 with intensity proportional to $\cos \phi$, and therefore the total flux exiting a cone of half-angle $\phi$ is Flux($\phi$)=$\int_0^\phi \int_{-\pi}^\pi \cos\alpha \sin\alpha d\theta d\alpha = \pi \sin^2 \phi$=
DiskArea($r$=sin $\phi$)

Some embodiments are based on recognition that it is possible to uniformly irradiate a disk with an optic that maintains this relationship, in some fixed proportion q, for all radii up to some finite limit. To that end, a suitably shaped lens should refract rays emitted at inclination angle $\phi$ so that they hit a projection plane q sin $\phi$ units from the optical axis. To produce a uniformly irradiated disk of radius p using an emitted cone of light of half-angle $\beta$ 452, the above relationship implies that q=p/sin $\beta$. For example, one embodiment determines the angle $\beta$ so that the angle of incidence of the edge rays at the refracting surface approximates Brewster's angle. In such a manner, the embodiment can neglect losses due to Fresnel reflection.

Addressing the lens surface in spherical coordinates and the projection plane in polar coordinates, the correspondence between lens points and plane points is $$(R(\phi), \phi, \theta) \leftrightarrow \left(\frac{p}{\sin\beta}\sin\phi, \theta\right), \quad (1)$$

where $R(\phi)$ the radial extent of the lens surface at inclination $\phi$ from the optical axis, and $\theta$ the azimuthal angle on the lens and polar angle on the projection surface.

To derive the lens surface, some embodiments first use 2D Cartesian coordinates, with the light at the origin (0, 0), the optical axis running in the direction {+1,0}, and a perpendicular projection plane passing through (r,0). One implementation parameterizes this lens (in 2D) as (x,y)=: ($R(\phi)\cos\phi$, $R(\phi)\sin\phi$) and uses the cosine form of the law of refraction to relate the vectors of the incident ray I=(x,y)−(0,0), the exit ray E=(s,t)−(x,y)=(r,p csc $\beta$ sin $\phi$)−(x,y), and the surface tangent T=(dx,dy)=($\partial_\phi x$, $\partial_\phi y$):

$n \cos \angle IT = \cos \angle ET$.

with n being the ratio of refractive indices on either side of the lens surface.

Writing in vector form results $$n\frac{(x, y)^T (dx, dy)}{P(x, y)P \cdot P(dx, dy)P} = \frac{((s, t) - (x, y))^T (dx, dy)}{P(s, t) - (x, y)P \cdot P(dx, dy)P}.$$

One embodiment assumes that the lens is very small relative to the disk radius p and projection distance r, so that x=s, |y|=|t|, and the field of exit rays is determined by the surface normals with surface extent playing a negligible role. In the limit, this is exact: $\lim_{R(\phi)/min(r,p) \to 0} E=(s,t)$. Substituting the ray and tangent definitions and simplifying, the embodiment obtains $$n\frac{(x, y)^T (\partial_\phi x, \partial_\phi y)}{\sqrt{(x, y)^T (x, y)}} = \frac{(s, t)^T (\partial_\phi x, \partial_\phi y)}{\sqrt{(s, t)^T (s, t)}}$$

which expands into the ordinary differential equations (ODE)

$$R'(\phi)\left(n\sqrt{q^2\sin^2(\phi) + r^2} - (q\sin^2(\phi) + r\cos(\phi))\right) = \quad (2)$$
$$R(\phi)\sin(\phi)(q\cos(\phi) - r)$$

with q=p csc $\beta$. The solution takes the form $$R(\phi) = \frac{2k|\exp(p_2 - p_1)|}{1 + \cos(\phi)}$$

with $p_1$, $p_2$ being transcendent polynomials summed over the roots of quartic equations.

An alternative embodiment does not have the small lens assumption and design the Lambertian-uniformizing spot lens by approximating the exit surface as sphere in the exit ray E resulting in solvable ODE. Notably, the simulations confirm that the surface provides good uniformity even when the lens is of nontrivial size and there is an extended light source, provided that it is small relative to the lens.

In such a manner, some embodiments are based on understanding that the shapes of the Lambertian-uniformizing spot lens and the collection of Cartesian ovals can be analytically determined. Accordingly, the resulting optics for producing two-tone images can be also analytically determined.

Figure 5:
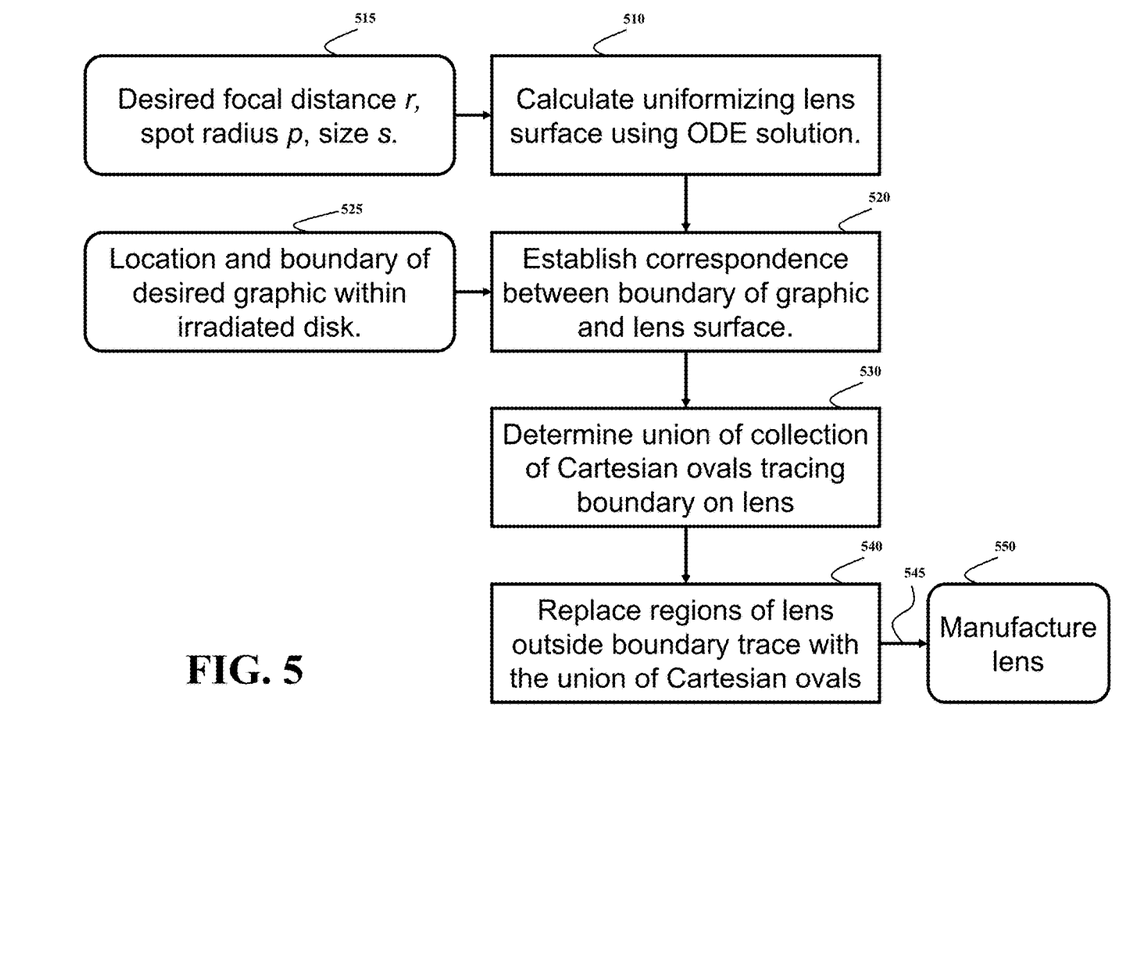
FIG. 5 is a block diagram of a method for making an optic that projects a graphic onto the projection surface according to one embodiment.

FIG. 5 shows a block diagram of a method for making an optic that projects a graphic onto the projection surface according to one embodiment. The embodiment determines 510 Lambertian-uniformizing spot lens for predefined parameters 515. For example, the predefined parameters 515 can include desired focal distance r, spot radius p, lens size s and the embodiment solves the ODE (2).

In addition, the embodiment establishes 520 correspondence between boundary of graphic and lens surface according to predefined location and boundary of desired graphic 525 within disk irradiated by the Lambertian-uniformizing spot lens. For example, the embodiment situates the graphic on the projection surface, e.g., a projection plane, and identifies the parts of the Lambertian-uniformizing spot lens surface that direct light outside the graphic's boundaries. These parts are then sunk and divoted so that they direct light to boundaries.

In some implementations, the correspondence of (1) is used to backproject the graphic from the projection plane to the lens surface. Let G be the subset of the projection plane occupied by the graphic and B be the corresponding set of emission angles through the lens, i.e.

$$(\phi, \theta) \in B \Leftrightarrow \left(\frac{p}{\sin\beta}\sin\phi, \theta\right) \in G.$$

G has boundary ∂G and similarly B has boundary ∂B.

Next, the embodiment determines a union of a collection of Cartesian ovals the sweeps 530 along the trace of boundary of the graphic projected on the Lambertian-uniformizing spot lens. For example, some implemntations construct a new function that sinks the surface of the lens wherever the lens refracts light outside G:

$$\tilde{R}(\phi, \theta) = \begin{cases} R(\phi), & \left(\frac{p}{\sin\beta}\sin\phi, \theta\right) \in G \\ \max_{g \in G} C_r(g, \phi, \theta) & \text{otherwise} \end{cases}$$

where $C_R(g,\phi,\theta)$ is the radial extent at $(\phi,\theta)$ of a Cartesian oval that focuses light to point g and whose surface is tangent to R(•) at the corresponding point b∈∂B on the original lens surface. The radial function of the Cartesian oval is $$v-p+\sqrt{p^2-2(c-1)(n^2-1)_g v/n^2-1}$$

where v is the distance from the light to the oval's vertex, $p=r_g(c-n)+(n-1)v$, and c is the cosine of the angle between a ray along $(\phi,\theta)$ and the oval's axis, which connects target point g at distance $r_g$ to the light at the origin.

Taking the max over all such ovals produces a focusing surface corresponding to a union of collection of Cartesian ovals where every point is contributed by a Cartesian oval. This focusing surface replaces 540 any unwanted refractions on the original surface of the Lambertian-uniformizing spot lens with refractions that transport light to the boundary of the graphic to produce a free form optical surface 545. In some embodiments, the points on the focusing surface have different surface normals than their contributing ovals, generally these normals are modestly tilted such that local ray refractions are displaced very slightly along the boundary's tangent lines.

Different embodiments compute the max function in a different manner. In some cases where the boundary ∂G is simple, the focusing surface can be derived analytically. More generally, since the surface is ultimately specified to the fabricating machine as numerical samples, these samples can be computed by representing the boundary piecewise as simple line and circular arc segments, sweeping the oval along these segments analytically, and using the resulting expressions to calculate the radial extent of nearby sunken points.

Next, the embodiments fabricate 550 the optics having a freeform optical surface 545. For example, one embodiment fabricates the optics using injection molding of plastic optics. The development of electrical-discharge machining (EDM) has provided means for fabricating optical-quality freeform surfaces in the metal of the mold. EDM in turn depends upon five-axis and six-axis machining to produce the desired freeform surface as a carbon electrode of identical dimensions as the part to be produced. This electrode is used to electrically burn into metal a concavity matching its own shape, thereby providing a mold cavity that imparts the desired shape to molten plastic. Beyond the replicative methods of injection molding, freeform surfaces can be produced directly in some optical materials, such as acrylic, with multi-axis machining techniques, albeit at greater per-part expense than injection molding and thus typically employed for prototypes. Many other freeform prototyping technologies exist, including 3D-printing of optical polymers and robotic deformation of metallic sheets.

For the case where incident light is collimated, some embodiments take the limit of the above equations as the light source moves away to (−∞,0), while holding the lens-to-target distance constant. In that limit, the lens and projection plane subtend an infinitely small cone of the beam, therefore from their vantage, the Lambertian point emitter is becomes a uniform collimated beam, the uniformizing lens surface becomes flat, the oval becomes a hyperboloid, and the point of tangency is always the hyperboloid vertex. Consequently, the entire construction simplifies to a max-convolution (also known as a grayscale dilation) of a hyperboloid with a height field that is zero inside g and −∞ outside.

One advantage of the embodiment with the collimated light is that lenses and lens molds could be cut from flat stock with very little machining. In particular, a high-fidelity mold could be cut using standard pocketing techniques on a 3-axis mill using a bit that has a flat end and a hyperbolic side profile.

Figure 6A:
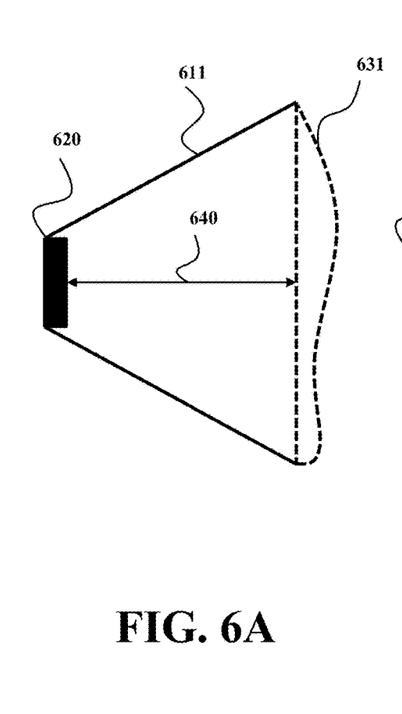
FIGS. 6A, 6B, and 6C are examples of luminaire having the optics determined according to various embodiments of the invention.
Figure 6B:
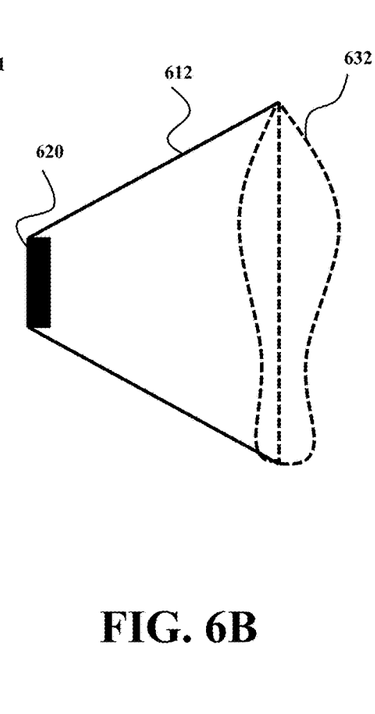
Figure 6C:
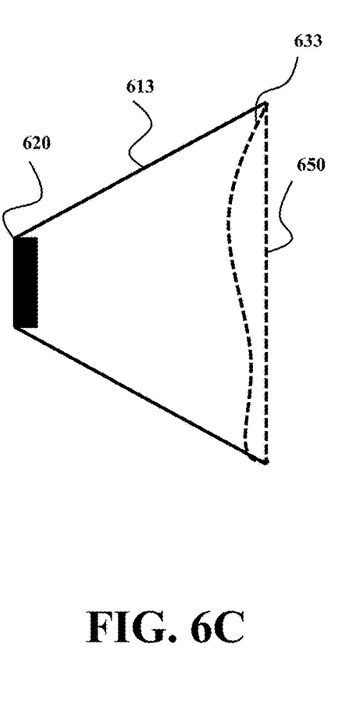

FIGS. 6A, 6B, and 6C shows examples of luminaire having the optics determined according to various embodiments and a light source 620 arranged in the luminaire to emit the light onto the freeform optical surface. For example, the light source 620 can be arranged at a distance 640 from the freeform optical surface, and such a distance is considered in the determination of the freeform optical surface. For example, in some embodiments, the shape of the freeform optical surface is a function of the shape of the emitting area of the extended light source and an arrangement of the light source with respect to the freeform optical surface.

In different embodiments, the freeform optical surface can be one or double sided. For example, in the exemplar luminaire 611, the optic 631 has one sided freeform optical surface. The freeform surface of the optic 631 is the furthest surface from the light source 620, and the closest surface is flat. In the exemplar luminaire 612, the freeform optical surface of the optic 632 is double sided, i.e., both sides of the optic are freeform optical surfaces. In the exemplar luminaire 613, the closest to the light source 620 surface of the optic 633 has a freeform.

In some embodiments, the luminaire projects the target illumination pattern on a screen external to the luminaire. Examples of such a screen include a wall or any other flat surface. In alternative embodiment, the optics of luminaire itself can serve as a screen. For example, in one embodiment, a surface 650 of the optic 633 opposite to the freeform optical surface is frosted, such that the illumination pattern is formed on the frosted surface. Additionally, or alternatively, the luminaire can have a secondary optics for imaging and display purposes.

Figure 7A:
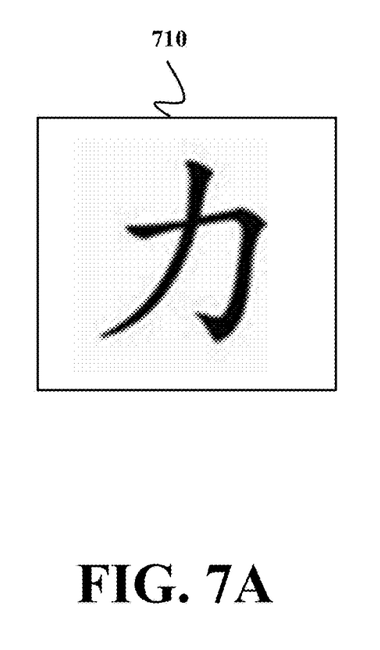
FIGS. 7A, 7B, and 7C are different nonlimiting examples of various target illumination patterns produced by some embodiments.
Figure 7B:
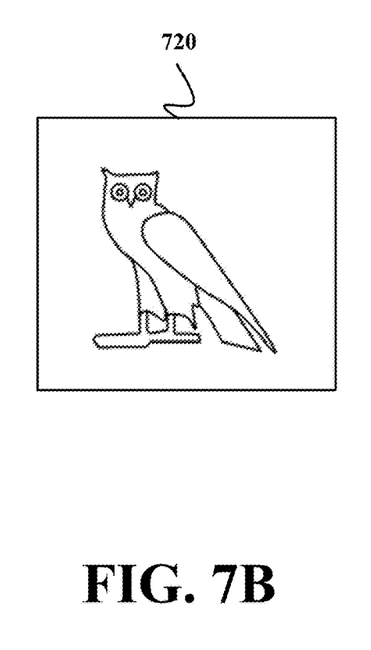
Figure 7C:
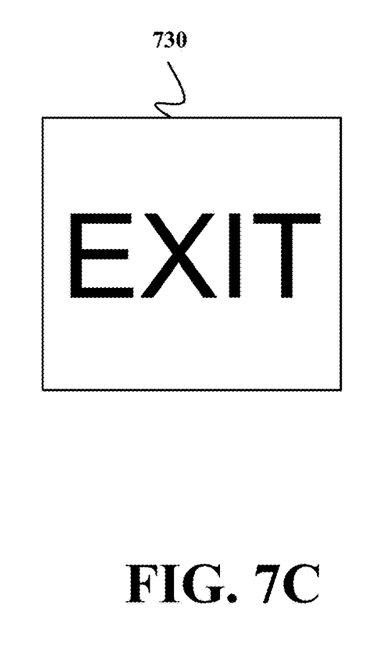

FIGS. 7A, 7B, and 7C shows different nonlimiting examples of various illumination patterns produced by some embodiments. For clarity purposes, the illuminated pattern shown using black line. In practice, those exemplar images can be inversed. For example, in some embodiments, the illumination pattern includes a glyph 710 or an artistic image 720. For example, the illumination pattern can include letters forming a word 730. In some embodiments, the illumination pattern is an asymmetrical pattern. The illumination pattern can also have brightness gradients.

Figure 8:
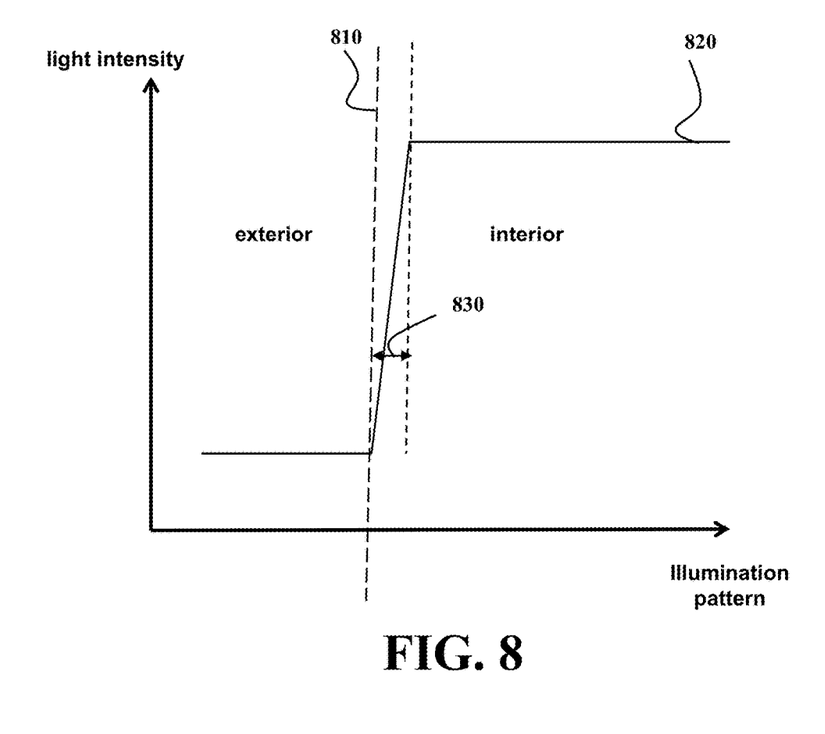
FIG. 8 is a graph of light intensity for a sharp-edged boundary of the target illumination pattern according to some embodiments.

FIG. 8 shows a graph 820 of light intensity for a sharp-edged boundary of the target illumination pattern according to some embodiments of the invention. The boundary 810 separates exterior from the interior of the illumination/irradiation pattern. As seen on the graph, the rate of change of the light intensity causes the light intensity to change from minimal to maximal values within a predetermined distance 830 from the border 810. Such a distance 830 is found in the focused images and is governed by the second law of thermodynamics.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. An optic to transform incident light emitted by a light source to form an irradiation pattern on a projection surface, wherein the optic has a freeform surface formed by a union of an aspheric lens and a collection of Cartesian ovals, wherein each Cartesian oval is a lens focusing the incident light to a point, and wherein the collection of Cartesian ovals directs the incident light to a collection of points forming a border of the irradiation pattern, and wherein the aspheric lens is a portion of a refractive lens directing the incident light to form an interior of the irradiation pattern, wherein the aspheric lens is combined with the collection of Cartesian ovals to form the union, such that each Cartesian oval shares a radiant focus of the refractive lens and makes a tangential contact with the surface of the aspheric lens at a single point.

2. The optic of claim 1, wherein the intensity of the incident light follows Lambert's cosine law, such that the light source is a Lambertian light source, wherein the refractive lens is a Lambertian-uniformizing spot lens reversing the Lambert's cosine law to produce, in response to illumination by the Lambertian light source, a uniform irradiation on the projection surface forming the interior of the irradiation pattern.

3. The optic of claim 2, wherein each Cartesian oval shares the radiant focus of the Lambertian-uniformizing lens, wherein each Cartesian oval has a unique focus on the border of the irradiance pattern defined by an optical axis of the Cartesian oval, and wherein each Cartesian oval makes a tangential contact with the surface of the aspheric lens at a unique point.

4. The optic of claim 1, wherein at least some Cartesian ovals in the collection of Cartesian ovals have different geometric parameters defined by a focus of the Cartesian ovals on the border of the irradiance pattern and a location of the tangential contact with the refractive lens.

5. The optic of claim 1, wherein the freeform surface of the lens formed by the union of the aspheric lens and the collection of Cartesian ovals is a surface of the refractive lens having a divot routing rays of the incident light passing through the divot from an exterior of the irradiation pattern to the border of the irradiation pattern.

6. The optic of claim 1, wherein the incident light is collimated, the refractive lens has a flat surface, each the Cartesian oval includes a hyperboloid shape and makes the tangential contact with the surface of the aspheric lens at a hyperboloid vertex.

7. The optic of claim 1, wherein the illumination pattern includes a glyph.

8. The optic of claim 1, wherein the illumination pattern includes letters forming a word.

9. The optic of claim 1, wherein the illumination pattern includes a two-tone image.

10. The optic of claim 1, wherein a surface of the optic opposite to the freeform optical surface is frosted, such that the illumination pattern is formed on the frosted surface.

11. A luminaire, comprising:
the optic of claim 1; and
the light source arranged in the luminaire to emit the light onto the freeform optical surface to produce the illumination pattern.

12. The luminaire of claim 11, wherein the light source includes a light-emitting diode (LED).

13. The luminaire of claim 12, wherein the shape of the freeform optical surface is a function of an arrangement of the LED with respect to the freeform optical surface.

14. The method for fabricating an optic, comprising:
determining a freeform optical surface transforming incident light emitted by a Lambertian light source into an illumination pattern on a projection surface, wherein the freeform optical surface of the optic is formed by a union of a portion of a Lambertian-uniformizing spot lens producing, in response to illumination by the Lambertian light source, a uniform irradiation on the projection surface forming an interior of the irradiation pattern, and a collection of Cartesian ovals focusing the light from the Lambertian light source along the border of the irradiation pattern; and
fabricating the optic having the freeform optical surface.

15. The method of claim 14, further comprising:
determining the Lambertian-uniformizing spot lens transforming the incident light emitted by the Lambertian light source into uniform irradiation of the projection surface;
determining the portion of the Lambertian-uniformizing spot lens contributing to the irradiation of the interior of the irradiation pattern;
determining a volume formed by the collection of Cartesian ovals focusing the light from the Lambertian light source along the border of the irradiation pattern; and
combining the portion of the Lambertian-uniformizing spot lens with the volume to form the freeform optical surface of the optic, such that each Cartesian oval makes a tangential contact with the portion of the Lambertian-uniformizing lens at a single unique point.

16. An optic, comprising:
an aspheric lens formed by a portion of a Lambertian-uniformizing spot lens transforming incident light emitted by a Lambertian light source into uniform irradiation; and
a union of Cartesian ovals, wherein each Cartesian oval is a lens focusing incident light to a point, wherein each Cartesian oval shares the radiant focus of the Lambertian-uniformizing lens and makes a tangential contact with the surface of the aspheric lens at a single unique point.

17. A luminaire, comprising:
the optic of claim 16; and
the Lambertian light source arranged in the luminaire to emit the light onto the optic, wherein the Lambertian-uniformizing spot lens transforms the incident light emitted by the Lambertian light source into uniform irradiation forming an interior of an irradiation pattern, and wherein each Cartesian oval transforms the incident light emitted by the Lambertian light source onto a corresponding point at a border of irradiation pattern.

18. The luminaire of claim 17, wherein the illumination pattern includes a letter, such that the union of Cartesian ovals directs the incident light to form a contour of the letter and the Lambertian-uniformizing spot lens directs the incident light inside the contour.

* * * * *